United States Patent [19]

Cairo, Jr. et al.

[11] Patent Number: 5,156,745

[45] Date of Patent: * Oct. 20, 1992

[54] INDUCED GAS LIQUID COALESCER AND FLOTATION SEPARATOR

[76] Inventors: John A. Cairo, Jr., 16826 Shady Arbor La., Baton Rouge, La. 70817; John A. Young, 8655 Jefferson Hwy. #11, Stones Throw, Baton Rouge, La. 70809

[*] Notice: The portion of the term of this patent subsequent to Jan. 14, 2009 has been disclaimed.

[21] Appl. No.: 613,388

[22] Filed: Nov. 13, 1990

Related U.S. Application Data

[63] Continuation-in-part of Ser. No. 521,262, May 9, 1990, Pat. No. 5,080,802.

[51] Int. Cl.⁵ .................................... B01D 17/022
[52] U.S. Cl. ................................. 210/703; 210/704; 210/708; 210/709; 210/712; 210/744; 210/799; 210/96.1; 210/104; 210/139; 210/194; 210/196; 210/206; 210/DIG. 5
[58] Field of Search ............... 210/703, 708, 709, 712, 210/723, 799, 744, 96.1, 104, 139, 194, 196, 206, 221.2, 528, 704, DIG. 5; 209/170

[56] References Cited

U.S. PATENT DOCUMENTS

| | | | |
|---|---|---|---|
| 1,940,762 | 12/1933 | Mahone | 210/768 |
| 2,669,440 | 2/1954 | Lindenbergh | 210/221.2 |
| 3,542,675 | 11/1970 | Mail et al. | 210/703 |
| 3,948,767 | 4/1976 | Chapman | 210/DIG. 5 |
| 3,948,768 | 4/1976 | Chapman | 210/DIG. 5 |
| 3,956,128 | 5/1976 | Turner | 210/221.2 |
| 4,191,651 | 3/1980 | Cheysson et al. | 210/DIG. 5 |
| 4,255,262 | 3/1981 | O'Cheskey et al. | 210/703 |
| 4,277,347 | 7/1981 | Pielkenrood | 210/704 |
| 4,308,136 | 12/1981 | Warne, Jr. | 210/DIG. 5 |
| 4,335,001 | 6/1982 | Yves et al. | 210/DIG. 5 |
| 4,428,841 | 1/1984 | Favret, Jr. | 210/747 |
| 4,442,000 | 4/1984 | Pielkenrood | 210/DIG. 5 |
| 4,454,047 | 6/1984 | Becker et al. | 210/705 |
| 4,564,457 | 1/1986 | Cairo, Jr. et al. | 210/704 |
| 4,782,789 | 11/1988 | Canzoneri | 210/703 |
| 4,834,872 | 5/1989 | Overath | 210/221.2 |
| 4,874,528 | 10/1989 | Foreman et al. | 210/705 |
| 4,964,733 | 10/1990 | Fredriksson et al. | 210/703 |
| 4,980,070 | 12/1990 | Lieberman | 210/DIG. 5 |
| 4,981,582 | 1/1991 | Yoon et al. | 210/221.2 |
| 4,986,903 | 1/1991 | Canzoneri et al. | 210/703 |
| 5,011,597 | 4/1991 | Canzoneri et al. | 210/221.2 |

Primary Examiner—Stanley S. Silverman
Assistant Examiner—Cynthia L. Nessler
Attorney, Agent, or Firm—L. Dan Tucker

[57] ABSTRACT

Simplified single cell fluid flow apparatus for flotation removal of suspended impurities and liquids are provided wherein the method and apparatus are directed to an induced gas liquid coalescer for flotation separation of suspended impurities. The apparatus provides for a separation vessel which can be fabricated to withstand internal pressure requirements experienced in flotation separation devices wherein the apparatus induces maximum gas volumes consistent with optimum mass transfer of gas medium to suspended impurities in the liquid while controlling intercell or vessel chamber turbulence. Such maximum gas induction achieved without turbulence is through the use of microscopic gas bubbles. Such microscopic gas bubbles provide massive surface area with which the suspended impurities adhere and allows for various apparatus utilization. The continuous operation of the clarification separation is also enhanced by utilization of a sensing probe means for detecting high oil content in combination with diversion means for removing oil slugs to skim removal means as a result of reducing the clarified liquid removal from the bottom portion of the separation chamber. Resultant high oil concentration purge is achieved, nullifying contaminated effluent water discharge from the vessel.

27 Claims, 4 Drawing Sheets

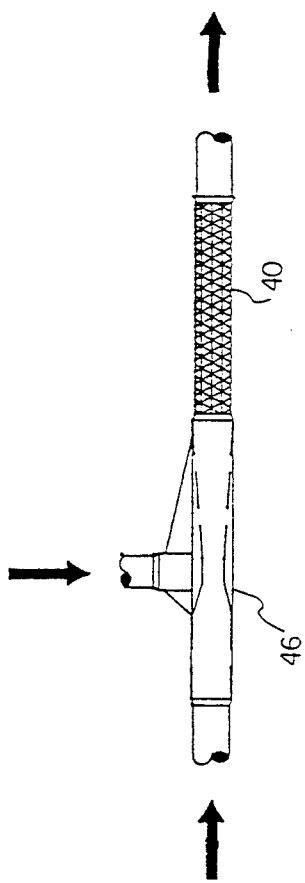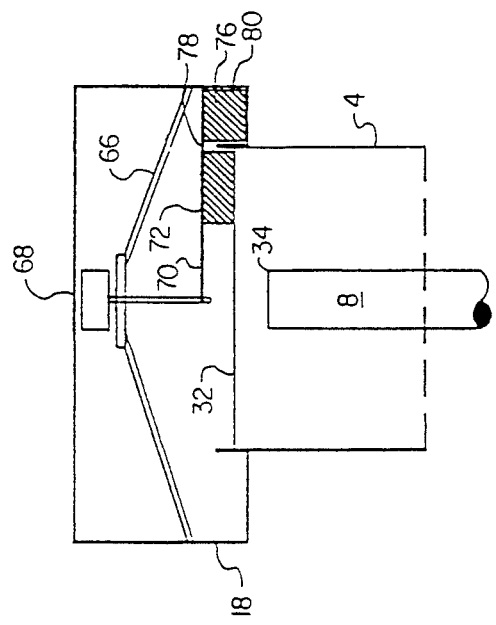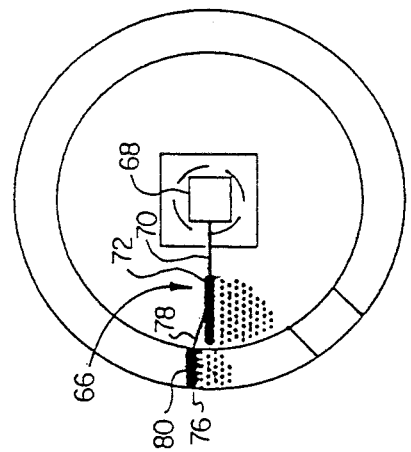

INDUCED GAS LIQUID COALESCER AND FLOTATION SEPARATOR

This is a continuation-in-part application of Ser. No. 521,262 filed May 9, 1990, now U.S. Pat. No. 5,080,802.

BACKGROUND OF THE INVENTION

The present invention relates to a method and apparatus for removing suspended matter from liquid. The method and apparatus of the present invention further relates to liquid-solids and/or liquid-liquid separation. More particularly, the present invention relates to a method and apparatus which coalesces and separates suspended matter from water.

Multiple industries including oil, paper and pulp, textiles, electricity generating and food processing present an ever present and growing problem of contaminated liquids, especially water as a by product of the various processes; in particular, water produced in the oil and gas industry. A method commonly used to separate oil and suspended material from water and other liquids is the air flotation separator. Two basic types of gas flotation systems exist, the dissolved air or gas and the induced air or gas approach. Both systems disperse gas into the contaminated liquid thereby causing the formation of bubbles which adhere to the suspended materials, thereby floating the suspended materials to the surface of the liquid for removal. Dissolved air systems disperse a relatively small gas volume and produce a very small gas bubble, for example about 100 microns or less. The small bubbles have massive surface area potential for impurity adhesion. Due to the relatively small gas volumes employed however, known apparatus require large retention tanks to facilitate the mass transfer of the low gas rate microscopic bubbles into the impurity laden water. As a result, dissolved gas flotation is impractical because of the size of the equipment, expense of construction and more importantly, space limitations on oil producing platforms.

Hydraulically induced gas separators draw larger gas volumes by recirculating water or the liquid back to the main separator. The gas entrained recycled water is dispersed within compartmented aeration cells. The objective of these systems is to contact the water passing through the cells with gas bubbles. While the hydraulic flotation devices are generally smaller in size than the dissolved air systems, the hydraulic flotation devices present a new series of problems For example, the larger bubbles formed by the higher gas rates create turbulence within the shallow depth aeration chambers. Floated impurities which may otherwise collect on the surface are consequently reentrained within the liquid. Mechanical induced flotation utilizing motorized impellers to draw gas are also plagued with a number of fabrication, operational and maintenance disadvantages. One major disadvantage of both the hydraulic and mechanical flotation cell is the system tank design. Due to cost restraints, the substantially rectangular tank cannot withstand internal pressure of more than just a few ounces per square inch. In view of existing and proposed government environmental and safety regulations, leaking access covers and vents to the atmosphere are unacceptable. Hazardous emissions, particularly lethal hydrogen sulfide and the like, exposure to operating personnel or the environment are of particular concern when clarifying water which has been generated in the oil industry, i.e., produced water.

U.S. Pat. No. 4,564,457 provides another gas induced flotation separator apparatus. The flotation apparatus teaches improvements to the induced gas flotation methodology by providing a tank which can be built to withstand the internal pressures common in the petroleum production and chemical manufacturing industries. The 457 patent also teaches a smaller sized tank with no moving parts. The apparatus comprises a cylindrical tank having an inlet chamber, a plurality of gassification chambers and a quiescent outlet chamber A skim trough is disposed near the top of the tank and extends the length of the gassification chambers into the outlet chamber Vertical baffles which separate the individual chambers extend downwardly and are spaced from the bottom of the tank, allowing fluid to flow along the bottom of the tank from the inlet chamber to the outlet chamber. Each gassification chamber is equipped with an eductor nozzle assembly positioned centrally in the lower portion thereof. The nozzle assembly provides for recirculation of fluid pumped from the outlet chamber.

Yet another system disclosed in U.S. Pat. No. 4,255,262 provides an apparatus which mixes and disperses gas in the form of fine bubbles in liquid in a tank in an attempt to remove contaminants from the liquid flowing through the tank. The gas is induced from an upper section of the tank downward into the liquid in the tank via a draft tube. The gas induction occurs as a portion of the liquid contained in the vessel is recirculated back through the individual cells or compartments using a centrifical pump. The apparatus uses a mechanical skimmer assembly which serves to remove contaminant laden froth as the froth accumulates above the liquid level section of the tank.

The aforementioned apparatus suffers from various deficiencies; for example, the skimmers are moderate to high maintenance items especially in corrosive environments frequently encountered in the oil producing or chemical industries In addition, the tanks are rectangular and cannot withstand pressure in excess of a few ounces per square inch internally. Such pressure limitations are particularly disadvantageous especially where the system pressure upstream of, for example, an oil/water separator, is prevalent or where noxious or lethal gases such as hydrogen sulfide are present Furthermore, the rectangular tanks having the sideboard skimmers are limited in volumetric capacity because full utilization of the tanks is not allowed. Although these tanks are described as "gas tight", low gas pressures are maintained by continuously venting gas to the atmosphere which is a potentially dangerous practice if lethal or flammable gasses are present and may be in violation of federal, state and local environmental requirements.

While the features of U.S. Pat. No. 4,564,457 present improvements to conventional flotation separation technologies, the patent fails to envision a single pass flotation separator system which has the ability to create microscopic bubbles with the higher gas volume necessary for optimum mass transfer of the gas to the impurity laden liquid and to do so without the consequences of inter-cell turbulence. Particularly, the patent does not envision the aforementioned improvements of the flotation separator technologies utitlizing a single flotation chamber. The reference also fails to provide an induced gas flotation cell which has external gas rate adjustability; therefore the need still exists to drain the liquid from the tank, purge the vapors, and then physically enter the unit for adjustment. The 457 patent also neglects small bubble diameter in the presence of high gas rates which promotes maximum contact-coalescence. As a result, systems manufactured and utilized as taught by the aforementioned patent and other conventional designs, remain physically large utilizing multiple aeration cells in order to achieve the efficiency of liquid clarification achievable by the single cell apparatus of the present invention. The present invention provides apparatus and methodology for inducing gas rates substantially greater than heretofore applied in the known flotation art, but without the inter-cell turbulence and reentrainment consequences observed in the conventional designs. The present invention provides apparatus comprised of a reduced equipment sizing, yet having the ability to generate microscopic bubbles even in substantially flat water i.e., tap water. The apparatus further provides a relatively quiescent surface with minimum wave generation. In addition, high free oil surges are sensed and diverted to skim means thereby avoiding noncontaminant clear water effluent.

In yet another embodiment, the apparatus and method according to the invention allows for utilizing a modified, existing vessel in combination with an exterior skid mounted induced gas liquid coalescer. In one mode of operation, the apparatus and method provides for recycling of gasified clarified liquid from the separation vessel and, in combination with a relatively larger system including the separation vessel, the method utilizes gas bubble mass transfer within the retrofitted vessel to accomplish the contact-coalescense surface area required for adequate separation.

In another mode of operation, the apparatus and method according to the invention allows for the utilization of influent feed flow from a primary collection and skimmer vessel with gasified discharge from invention apparatus into a second final clarification vessel wherein oil and solids laden froth is skimmed from the liquid surface. Clarified water discharge from second vessel being adequate for disposal and/or further polishing.

SUMMARY OF THE INVENTION

The apparatus and method of the present invention provides a system which solves the problems confronted utilizing existing systems in the art of clarifying liquids utlilizing induced gas flotation separation. What is provided is an induced gas coalescer comprising a main separation vessel which may be of various configurations; preferably such a vessel would be capable of withstanding virtually any pressure requirement. The vessel defines a chamber which is in communication with an inlet for receiving influent liquid which has passed through an eductor means for inducing gas into the influent The vessel chamber provides means for maintaining a liquid level into which the gas induced influent is released. In one embodiment, the release is generally below the liquid level of the contained liquid and a removal means is presented for froth skimming and discharge. A trough is located in the upper portion of the vessel for receiving and removing froth laden impurities which have accumulated on the liquid surface. The chamber is in communication with an outlet means in a lower portion thereof for discharging clarified liquid. The apparatus is provided with a gas supply to the gas eductor means and optionally, an inline injection of various flocculating, coagulating or other chemicals into the influent liquid stream which may assist in impurity separations and removal.

The gas eductor means provides optimum high gas rates in a continuous flow or a partial flow of influent stream. The eductor means has a gas intake which is adjustably controlled according to need in relationship to the fluid flow of the influent. Such external eductor means having external adjustability eliminates the need to physically enter the tank which must be first drained and devaporized for adjusting fluid flow. In addition, gas/liquid contacting mechanism such as static mixers or related devices are provided to disperse intake gas in optimum amounts within the flow of influent liquid to achieve maximum gas bubble surface area. The static mixer in combination with the eductor mechanism provides an effervescent release of the gas induced influent below the liquid level within the chamber. The gas/liquid contacting mechanism generates minute bubbles for maximum impurity adhesion capability thus, maximum clarification of the influent liquid utilizing minimum apparatus volumes as compared to liquid throughput. These minute bubbles provide the apparats and methodology with greatly restricted turbulence otherwise present in a fluid stream as a result of maximum gas rates and in the avoidance of turbulence provides a substantially nonturbulent effervescent release zone on the surface of the liquid. Efficient impurity contacting with small gas bubbles improves impurity adhesion and thereby reduces vessel chamber retention time requirements and thus, reduced vessel chamber size. The provisions for inducing gasified liquid influent flow to the vessel chamber via an internal chamber riser tube utilizing a coalescer riser pack, running substantially the length of the liquid level within the chamber however, releasing in open communication with the liquid below the liquid level, allows for the efficiency of separation and apparatus sizing according to the invention. The riser tube coalescer riser pack can be fitted with alloy or plastic packing medium with which coalescence of the impurities passing through the pack will occur. Generally, a means is provided for discharging the coalesced impurities near but slightly below the liquid level. However, the release can be at the liquid surface or further removed below the surface depending on process demands. Further provided according to the invention is a means for collecting and removing contaminant laden froth in the upper portion of the chamber which also serves as a gas collection zone of the vessel. This removal can be provided through a stationary circumferential trough with adjustable sides and/or motorized skimmer blade mechanism and trough combinations. In the use of optional skimmer mechanisms, the blades are vertically adjustable to achieve precise froth removal. Skim removal may be constant or intermittent which can be achieved by timer related valve controlled flow rates which upon intermittent cycles will overflow the contaminant laden froth into the froth removal troughs.

Certain industries produce process and waste water streams which contain suspended matter which is considered to be a useful by-product. Therefore recovery of the suspended matter is required. For instance, in the poultry processing industry the oil and grease and solids are recovered, further processed and used as a blend for animal food. Before this material can be used in the final product a series of dewatering and drying steps are performed. Because it is advantageous to have as low a moisture content as possible at the outset to reduce downstream solids drying, maximum solids content must be removed from the liquid solids separation equipment.

The invention defines a unique froth skimming and removal apparatus. For instance, influent water flow which is delivered to the liquid surface of the separator via the riser and coalescer pack causes the formation or partial formation of froth accumulation on the liquid surface. In addition, the fine gas bubbles rising to the surface from the periphery of the vessel's riser further contributes to the froth build-up. The invention provides a skim trough and mechanical skimming apparatus. The trough is comprised of a circumferential channel means which allows for froth overflow on its inboard side. The outboard side of said skim channel is the vessel wall. On the underside or floor of said trough there is at least one opening which is in communication with at least one froth exit point or froth discharge conduit. Said discharge conduit may be a cylindrical pipe or other configurated duct. The skim trough channel, froth exit opening and froth discharge conduit are sized according to separator system dynamics, hydraulic loading as well as nature and quantity of froth.

In addition, a means is provided for sensing and/or controlling the liquid froth interface level within the vessel chamber. This level controlling mechanism can be electrical-mechanical and/or pneumatic or may be comprised of an external tank standpipe utilized in conjunction with clarified effluent discharge connection piping and valves.

A density or conductivity probe is utilized by extending the probe into the vessel chamber at a level beneath the water-froth interface for sensing density change or conductivity change resulting from high concentration slugs of free oil and the like. The probe mechanism is designed to override automatic skimmer timers or automatic flow controls and cause clear water or clarified liquid outlet valves to close or partially close thus causing the oil sludge and froth to be discharged to skim sections of the vessel and be removed with normal reject skimmings. Such a probe mechanism provides a positive prevention of discharge of oil laden liquid or water resulting from free oil surges that would otherwise contaminate the separator vessel chamber clear water volume. The probe feature is particulary functional in view of the vessel chamber riser tube release which delivers the concentrated oil surges near the liquid surface in the vicinity of the oil froth skimmer trough. Apparatus without the probe mechanism and controls allow delivery of oil slugs into a lower section of a separator cell or chamber causing contamination of the clarified liquid therein. As a result of the quality of water exiting the prior designed cells will be greatly impaired depending on the frequency of occurrence of oil slug presence in the influent.

It is, therefore, an object of the present invention to provide an improved method and apparatus for removing suspended matter and/or oil from liquid utilizing an induced gas coalescer. The apparatus provides for a main separation vessel which can be fabricated to withstand internal pressure requirements and which does not vent or leak potentially life threatening and/or explosive vapors to the atmosphere. The method and apparatus according to the invention utilizes maximum gas induction volumes consistent with optimum mass transfer of gas medium to contaminants while controlling inter cell or vessel chamber turbulence within the chamber contained liquid. The method and apparatus provides for maximum gas induction without turbulence through the use of microscopic gas bubbles and avoids reentrainment consequences, thusly improving froth collection and removal. Further, smaller gas bubbles provide massive surface area with which to adhere the impurities and result in apparatus utilization which is smaller and more compact for comparative volumes of influent clarification. Through the provision of additional gas-impurity contact as a result of internal coalescing medium to aid in liquid-solid separations allows for less retention time of the liquid in the vessel chamber. By also providing a conductivity or density probe means for sensing high oil concentrations, and diversion means for removing the oil slugs, to skim removal means results in the discharge of only clarified liquid.

An alternative embodiment of the invention is provided through the use of recirculated gasified liquid within a relatively large skimmer tank, for instance, multiple pass exposure ensures bubble surface area potential without necessarily using the static mixer in order to achieve mass transfer of high gas volume and thus efficient contact coalescence of impurities contained in the relatively larger skimmer vessel. The optional embodiment can be retrofitted to any existing piece of equipment to enhance the performance of the separation equipment. For example, an existing skimmer tank, which possibly is unable to produce sufficient separation quality, can be adjusted to a viable mode in separations performance through the use of an exterior skid mounted riser/coalescer through which the gasified liquid provides contact adhesion with contaminants present. Unlike typically known flotation cells, the apparatus according to the invention has no internal moving parts and, therefore, maintenance, downtime and expenses are minimized. The concept is not limited to skimmer tanks, but can also be used to enhance the performance for example of an API separator, a corrugated plate separator, and other equipment, such as SP Pack coalescers. The uniqueness of the optional inventive feature does not necessarily rely on small bubbles alone due to relatively large area for gasified liquid to contact contaminants. For example, the apparatus can utilize introduction of the gas by means other than an eductor. These alternative means are by pressurized gas source or by force draft blower. The static mixer is required to disperse the gas within the liquid. Utilization of a pressurized gas source and a static mixer produces sufficiently small gas bubble dispersement to ensure satisfactory separation in various tank separator systems. Suitable bubble surface areas are achieved through recycle of clarified, gasified liquid and riser/coalescer.

BRIEF DESCRIPTION OF THE DRAWING

While the specification concludes with claims particularly pointing out and distinctly claiming the subject matter that is regarded as forming the present invention, it is believed that the invention would be better understood from the following description accompanied by the following figures, FIGS. 1-5, wherein the figures present an overall presentation of the apparatus according to the invention. However, the specific means as shown in the figures are not deemed to be limiting since other suitable means can be substituted for the various portions thereof.

FIG. 3 is a cross-sectional side view of the isolated eductor assembly and gas-liquid static mixer portion of the apparatus shown in FIGS. 1 and 2.

FIG. 4 is a top cross-sectional view of the froth skimming and removal apparatus which is an optional feature of the invention.

FIG. 5 is a overall cross-sectional side view of the apparatus of FIG. 4 more clearly showing the function of the skim trough and mechanical skimming apparatus.

DETAILED DESCRIPTION OF THE INVENTION

Figure 1:
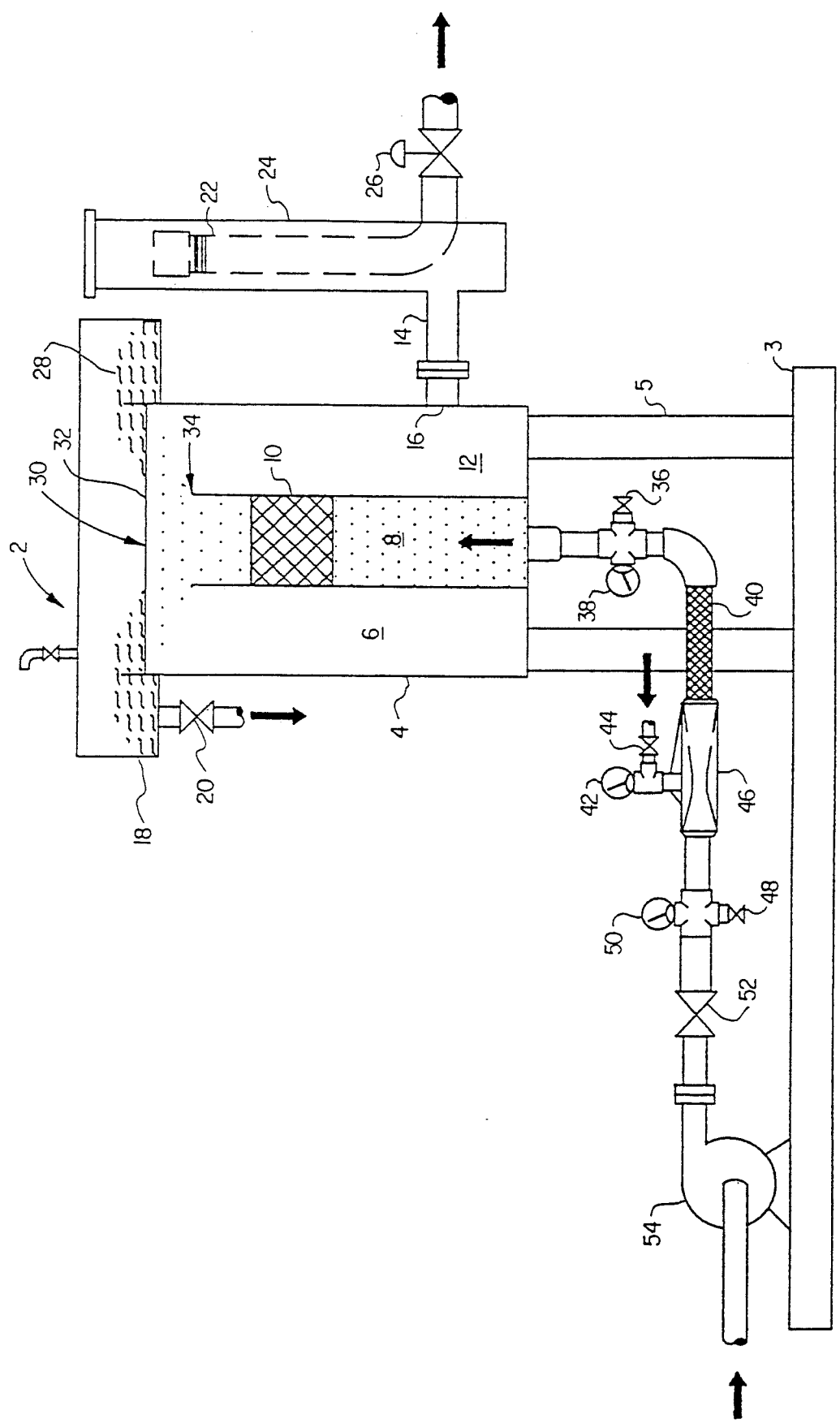
FIG. 1 presents an overall cross-sectional side view of the apparatus according to the invention.

The apparatus of the present invention as illustrated in FIG. 1 is generally indicated as an induced gas coalescer apparatus 2 with the apparatus being substantially dominated by the separator vessel 4. As illustrated in the figures, the separator vessel 4 can be a substantially elongated, vertical vessel which defines an induced gas flotation chamber 6. Within chamber 6, a coalescer riser tube 8 rises from a bottom portion of the chamber and is in open communication with the chamber contained liquid at or below the liquid surface. Within the coalescer riser tube 8 a coalescer pack 10 is positioned in order to insure final coalescence of influent contaminants. Clarified liquid is substantially present in the clear liquid well 12 portion of the chamber 6 and is withdrawn through the clarified liquid outlet 14 which communicates with the clear liquid well 12 through opening 16. A froth discharge trough 18 circumferentially surrounds the perimeter of the separator vessel 4. Coalescer discharge froth is collected in the discharge trough 18 and discharged from the trough 18 through outlet valve 20. An adjustable coupling 22 is illustrated in the figure which provides one mechanical method of maintaining liquid level within vessel chamber 6, the stand pipe 22 being vertically adjustable in length and serves as a method for releasing clarified liquid into the standpipe housing 24 and clear water outlet valve 26. Froth 28 is generated by the aeration and coalescence of impurities which have passed through the coalescer riser 8 and coalescer pack 10. The liquid level 32 is substantially uniform inclusive of the effervescent surface zone 30. The end of the coalescer riser 34 can be positioned in several heights in relationship to the liquid level 32 depending upon the geometry of the chamber 6, coalescer riser 8 and the throughput volumes of gas induced influent.

The induced gas flotation chamber 6 can be provided with a drain plug or port and the gas induced influent communication conduits with the coalescer riser 8 is provided with a sample valve 36 which is exterior to the induced gas flotation chamber 6. A pressure gauge is also provided exterior to the chamber 6 and downstream from the gas-liquid static mixer 40 which is immediately downstream from the gas injection eductor assembly 46 which brings together under energized conditions gas from a gas inlet valve 44. A related vacuum gauge 42 is used for determining gas flow in relationship to the influent flow. Influent samples can be taken before gas injection or chemical injection through sample valve 48 with the pressure of influent being indicated by pressure gauge 50. A system feed valve 52 is positioned downstream from the influent supply pump 54 for pumping influent flow either in a continuous or in a batch mode.

Various chemical additives can be added through the additive injection apparatus (not shown). Chemical additives are presented according to the invention as an optional feature. The additives are comprised of coagulants or flocculant agents and/or combinations of these agents and other materials. The amount and nature of the additives used depend upon the specific clarification needs and physical properties of the influent such as pH, particulate and/or emulsion suspension contaminations as well as the liquid to be clarified. In general, when clairifying water containing particulate and oil dispersions suspended in the water influent numerous coagulant and flocculant additives are available.

Figure 2:
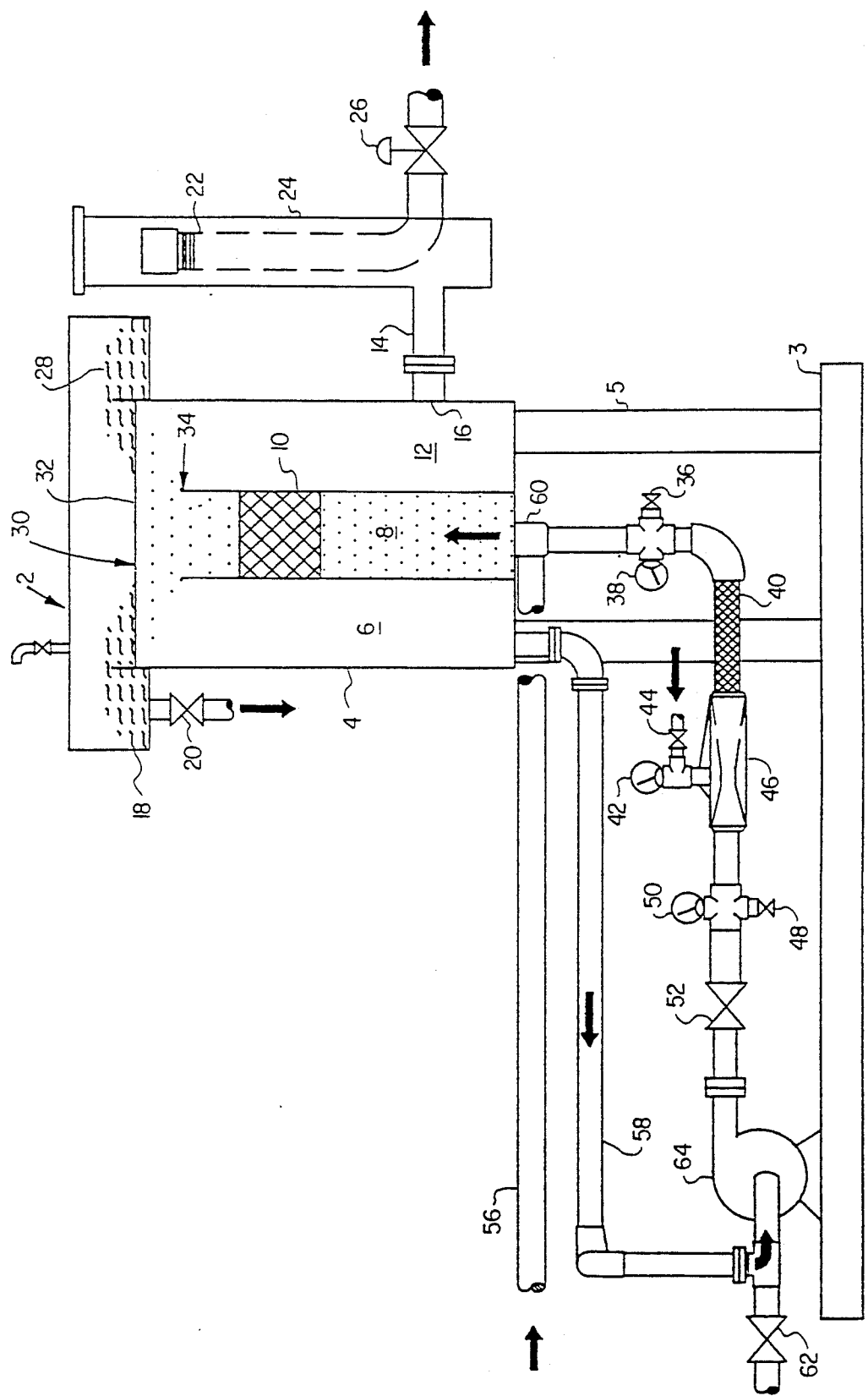
FIG. 2 presents the overall cross-sectional side view of the apparatus of FIG. 1 with an optional feature for introducing influent downstream from the gas-liquid static mixer and before entry into the coalescer riser.

The apparatus of the present invention provides an optional feature as illustrated in FIG. 2. The option is provided in order to accommodate certain industry waste water streams which contain substantial portions of suspended matter of such dimension which will generally clog or plug the apparatus; i.e., the gas-liquid mixer, coalescer pack and the like. In order to avoid such plugging, the apparatus as illustrated in FIG. 2 provides an influent supply 56 which bypasses the gas-liquid mixer 40 and joins the induced gas coalescer apparatus feed stream through an influent entry into the induced gas-liquid 60 which is downstream from the gas-liquid mixer 40. Clarified liquid recycle 58 is circulated through clarified liquid pump 64, therefore providing the driving force for the energized fluid flow. A second source influent or additional clear liquid supply can be provided through valve 62.

The injection eductor assembly and gas/liquid static mixer assembly is isolated and presented in FIG. 3. Gas and liquid are introduced to each other in the gas injection assembly 46 which is immediately upstream from the gas/liquid static mixer 40. The gas/liquid static mixer 40 brings the premixed gas and liquid from the gas injection eductor assembly 46 together under energized conditions which with the cooperation of the apparatus found in the static mixer 40 provides a highly gasified liquid fluid flow and uniform small bubble diameter.

The apparatus as illustrated in FIGS. 4 and 5 comprises a mechanical skimmer assembly 66 which consist of a high torque, low speed driving mechanism 68, for instance an electric motor. The motor can be mounted on a platform or base which is affixed to the coalescer riser 8 at an elevation from the riser discharge sufficient so as to avoid impedance of riser discharge flow and froth layer. Attached to the motor at substantially a right angle is the primary skimmer arm 70 which extends outwardly to near the outboard side of the trough 18 channel. Affixed to the primary skimmer arm 70 is the primary skimmer blade 72. The skimmer blade 72 is attached to the skimmer arm 70 with nuts and bolts for instance on slotted holes so as to facilitate upward or downward adjustability as may be required to remove the froth layer from the liquid interface with minimal liquid discharge into the skimmer trough 18.

Attached to the primary skimmer arm is the final skimmer assembly 76 which comprises a final skimmer arm 78, blade 80, is adjustable like skimmer blade 72. The final skimmer arm 78 is positioned at least one foot to the right of the primary skimmer assembly so as to cause a trailing or lagging of the final skimmer mechanism in relationship to the primary skimmer assembly. Within the confines of the skimmer trough 18, the final skimmer blade 80 is positioned within the trough and extends outwardly to near the sides of the trough and downwardly to near the bottom of the trough. Blade 80 is affixed with nuts and bolts on slotted holes for instance to allow vertical adjustability.

The function of the skimmer assembly 66 in combination with the skimmer trough 18 and froth exit points is the primary skimmer paddle/blade while rotating 360 degrees pushes the froth from the surface of the main separator vessel into the skimmer trough on a continuous basis. The trailing final skimmer arm 78 rotates 360 degrees simultaneously with the primary skimmer arm 70 axially. The final blade then pushes the froth contained within the trough into the exit port or ports (not shown) located in the floor of the trough. The exit ports being in communication with the froth discharge piping or duct work allows for the removal of the froth from the separator vessel.

The functionality of the mechanical skimmer and trough combination allows for the precise removal of the froth with minimal presence of water content therein. The residual moisture content of the froth can then be subsequently removed at lower energy requirements.

It has been found that in certain industries it is advantageous to regulate flow to the induced gas liquid coalescer and flotation separators according to the invention from an upstream feed tank. In the oil producing industry, for example flow into a surge/skimmer vessel varies from the upstream separation equipment. In order to maintain a desired level in the surge/skimmer vessel, the user will provide a modulating outlet valve to restrict exit flow from the vessel. In the apparatus according to the invention, for example, as illustrated in FIG. 1, the apparatus is provided with a nonregulated constant speed pump. The constant flow discharge from the pump is best suited to the dynamics of the eductor mixer assemblies for their respective performance. Therefore, a reduced flow would cause compromised gas rates and bubble diameter. Reduced influent flow rates to the apparatus of FIG. 1 would also drop the tank level thereby requiring continuous resetting of the level to achieve proper skimming on either constant or intermittent basis.

Problems created by variation in feed flow when utilizing a constant speed pump is resolved by utilizing the recirculation loop as indicated in FIG. 2. The recirculation line from the lower clear water section of the vessel which is introduced at the feed pump suction provides the necessary volume required to maintain the intended constant pumping flow rate independent of flow reductions from the user surge/skimmer tank. In operation, for example, the pump could be sized for 200 gallons per minute constant rate. This rate is reduced as the level controller in the surge/skimmer tank signals the tank outlet valve to partially close, for example, resulting in a new pump suction flow of only 100 gallons per minute. The 100 gallons per minute deficit is made up by a flow available through the recirculation loop as shown in FIG. 2. The pump is allowed to continue pumping at a constant 200 gallons per minute thus allowing the system's eductor-mixer apparatus to perform optimally. In addition, the balanced rate of 200 gallons per minute allows for constant unchanged level within the apparatus vessel according to the invention. Automatic or manual level adjustment otherwise needed without the makeup flow from the recirculation loop is eliminated. In the alternative, when the user's level condition end, the surge/skimmer tank demands a full tank discharge of 200 gallons per minute, the recirculation loop volume is not utilized.

Figure 6:
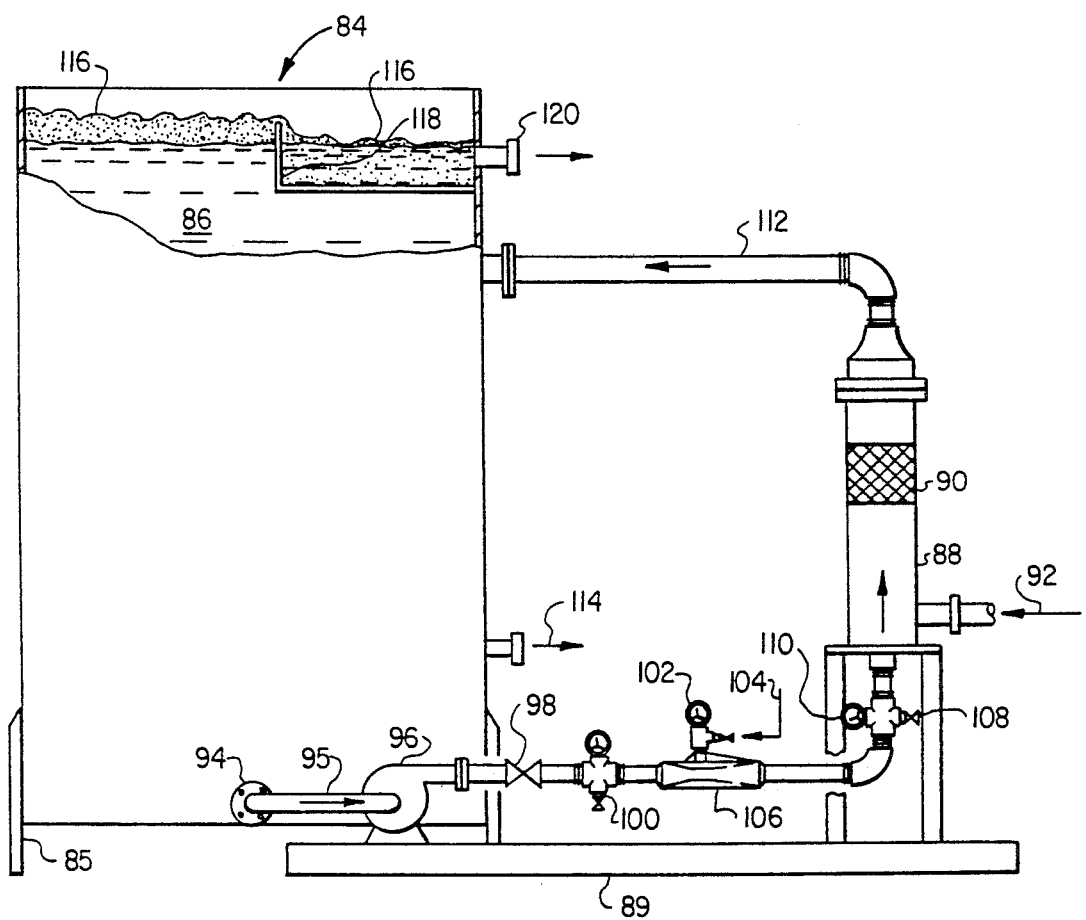
FIG. 6 presents a partially cutaway side view of an alternative apparatus embodiment of the invention wherein the riser/coalescer tube is outside the vessel and influent is introduced downstream of a gasified, recycled clear liquid stream.

In yet another embodiment of the apparatus according to the present invention is illustrated in FIG. 6 and is generally indicated as an induced gas coalescer apparatus comprised of a flotation separator vessel 84 mounted on support elements 85. The flotation separator vessel 84 having a liquid chamber 86; however, the coalescer riser tube 88 is mounted exterior of the flotation separator vessel 84 on skid 89. The coalescer riser tube 88 has a coalescer pack 90, and an influent source enters the system at influent source entry 92 which is in a lower portion of the coalescer riser tube 88. Clarified liquid recycle outlet 94 is positioned near the bottom of the flotation separator vessel 84 and is forced through pump 96 into a regasification zone and into the coalescer riser pack contact with the influent in the coalescer riser tube 88. The clarified liquid recycle stream conduit 95 is provided with a valve means 98 downstream from the pump 96 and upstream from a pressure gauge 100. Monitoring of the clarified liquid recycle is provided through flow gauge means 101. A vacuum gauge 102 is provided at the gas inlet valve 104 both in communication with the injection eductor assembly 106. A sample valve 108 and gasified recycle stream pressure gauge 110 are provided between the injection eductor assembly 106 and the coalescer riser tube 88 and before the influent source entry 92. Admixed influent and gasified clarified liquid recycle conduit 112 provides flow from the coalescer riser pack 90 into the flotation separator vessel 84 at an upper portion into the liquid chamber 86. The flotation separator vessel 84 has a clear liquid outlet 114 located in a bottom portion of the liquid chamber 86 for withdrawing clarified liquid. The insertion of the mixture of influent and gasified clarified liquid recycle into the liquid contained in liquid chamber 86 produces froth 116 which floats and flows over into a froth removal trough 118 through flotation and other means with the froth 116 being removed from the flotation separator vessel trough 118 through froth outlet 120.

The apparatus as illustrated in FIGS. 4 and 5 comprising a mechanical skimmer assembly 66 can also be utilized in the flotation separator vessel 84. In addition, the entry of the admixed influent and gasified clarified liquid recycle stream could be adjusted to other positions; for example, from a lower portion of the liquid chamber 86 to the upper portion, as illustrated in FIG. 6. The embodiment of FIG. 6 allows for the use of existing vessel equipment through adaptation of a skid mounted coalescer riser tube 88 in combination with an injection eductor assembly 106, or in the alternative, a pressurized gas or blower gas source (not shown). A pressurized gas source can be utilized in lieu of the injection eductor assembly 106 since a substantial portion of the liquid volume is recycled from a clarified liquid zone of the liquid chamber 86 and admixed in the coalescer riser tube 88 with influent. The utilization of substantial recycle and an enlarged existing vessel facility permits gas bubble contact-coalescence area requirements in a single pass operation as illustrated, for example, in the apparatus of FIG. 1. The recycle of gasified clarified liquid and use of an external source of pressurized gas or blower gas in combination with static mixer and admixing with the influent through the coalescer riser tube 88 coupled with the larger flotation separation vessel provides sufficient gas bubble surface area to accomplish the clarification separation of the liquid of the influent stream. Multiple coalescer riser packs can be mounted on the same skid in order to handle volume influent needs, especially wherein the flotation separator vessel is of considerable size. In addition, variations of multiple coalescer riser packs and even multiple existing separation vessels could be utilized wherein the riser packs and the recycle streams are admixed and managed exterior to the vessels, as shown in the embodiment of FIG. 6.

Pressurized gas or air blower source gas can be an alternative source to the eductors as a means for inducing gas into the systems of the invention. In the single pass system, as illustrated in FIG. 1, gas is educted and dispersed into small micron bubbles within the static mixer. Such an apparatus and process is appropriate for small to medium size systems; however, for larger units, it can be more practical to use an air blower or pressurized gas source in lieu of several eductors. However, even when pressurized gas or blower gas is utilized, the static mixer or mixers are still required to disperse the forced draft gas or air into the desired smaller bubbles. Therefore, the static mixer remains an important aspect of the overall apparatus and process of the systems as illustrated in FIGS. 1 and 2, as well as FIG. 6.

The apparatus as illustrated in part by FIG. 6 has eliminated the main separator tank as being part of the functional apparatus; i.e., the riser tube and coalescer pack contained within the riser tube shown in FIGS. 1 and 2 are mounted on an exterior skid in FIG. 6 and can be connected with existing vessel apparatus for separation purposes. The riser/coalescer, mounted external to any vessel, provides maintenance accessibility and control. However, an existing vessel could be retrofitted by installing the riser/coalescer inside the tank. But from a practical standpoint, the riser/coalescer mounted on an external skid, along with various pumps valving, gauging and control means, has been found to be a very suitable approach for producing enhanced flotation separation.

In the operation of the apparatus according to FIG. 6, recycled clarified liquid from the separation vessel is introduced into the riser/coalescer after being injected by gas by various means wherein it is admixed with influent requiring separation. In one mode of operation, the contaminated liquid coming from a source such as an oil field de-gasser vessel or heat treater would enter the system at the lower section of the riser/coalescer tube where the gasified, clarified recirculation water would mix with the contaminated water as it passes through the coalescer packing. As a result, the mixed contaminated stream and recirculating stream would then discharge into the separation vessel or skim tank where the stream is further exposed to fine bubbles contained within the liquid volume of the tank. The coalesced oil and/or suspended contaminants become more buoyant as they contact and adhere to rising bubbles. At the surface, a contaminant laden froth is removed by means of a skim trough located in the upper section of the tank. In the lower section of the skim tank, a clear water volume is established based in part on the rise rate of the bubbles contained within the tank. The discharge from the tank is suitable for direct discharge into surrounding water streams or for further processing.

The apparatus and system of the invention are designed to flow at a rate no less than the contaminated influent water rate from the de-gasser unit or heat treater. This ensures that each and every gallon of contaminated influent will not escape contact with the gasified recirculation water. In one actual field trial, an existing skimmer tank, which heretofore was unable to produce quality water, was made viable by the apparatus as illustrated in FIG. 6. The advantage to the user was that the user did not need to install additional flotation cell equipment downstream of the skimmer tank. Not only cost but space was conserved, which can be of substantial impact on offshore installations. In addition, the apparatus, according to the invention, requires less operator attention than flotation cell devices. Unlike flotation cell devices, the present invention has no moving parts, so maintenance downtime and expenses are further minimized.

The apparatus according to the invention, for example as illustrated in FIG. 6, is not limited to skimmer tanks. The apparatus and methodology can also be used to enhance the performance of, for example, an API separator, corrugated plate separators and the like, such as SP Pack coalescers. The apparatus according to the invention provides circulating liquid in the above equipment and provides bubbles that adhere to the contaminants and thus increase the effectiveness of phase separation.

Good water quality has been achieved according to the invention illustrated in FIG. 6 during field tests wherein the quality water produced had contaminants of less than 15 ppm. The system was designed to recirculate 5,000 to 10,000 barrels per day in a pre-existing skimmer tank. The recirculation water having passed through the apparatus of FIG. 6 provided the gas bubbles that contact the raw water influent stream from a low pressure separator/de-gasser. The two streams mixed thoroughly as they passed through the riser tube coalescer pack. The admixture flow entered the skimmer tank where the floating oil was removed from a skimmer section located in the uppermost part of the tank. The clarified water exited the tank from a discharge line near the tank's bottom. The field tests utilized gas eductors and static mixers.

The eductors introduced the gas volume into the system while the static mixer served to produce the micro bubbles. It should be understood that the static mixers, whether in combination with pressurized gas induction or gas eductors induction methodology are necessary for the apparatus according to the invention as set out in, for example, FIGS. 1 and 2. The static mixers may be far less essential to the functionality of the apparatus as illustrated in FIG. 6. The smaller bubbles are necessary in a relatively small main separator vessel because the smaller bubbles provide massive surface area contact potential and decreased intercell turbulence. However, in the apparatus of FIG. 6, the system provides a constant recirculation of gasified liquid within a relatively large skimmer tank; for instance, multiple pass exposure ensures bubble surface area potential. Therefore, the novelty of the apparatus and system is not necessarily the small bubble, but rather the fact that the apparatus can be retrofitted to an existing piece of equipment to enhance the performance of that equipment. For gas induction via pressurized source or blower means, static mixers are viable to disperse gas into microscopic bubbles.

The induced gas coalescer apparatus 2 may be skid mounted and sized for example for processing 100 gallons per minute of influent. The system would typically consist of a separator vessel 4 having about a 36 inch diameter by about 7 feet complete with influent supply feed pump 64, piping, valving, flow meters, eductors and the like. A stand pipe 24 of suitable diameter which runs substantially the length of separator vessel 4 illustrates one means for maintaining the appropriate liquid level within the chamber 6. Level adjustment is mad by screwing up or down on a loose threaded coupling which is affixed to the clarified liquid outlet 14, thus providing a simple apparatus for level control. The same function can be achieved with more complex automated liquid level control instrumentation and electromechanical means. Capacity can be expanded by the addition of one or more separation vessels of various size as plant capacity increases.

The method and apparatus according to the invention provides for removing suspended impurities from liquids, for example, water. The apparatus comprises a fluid flow vessel which defines a chamber for receiving and maintaining a liquid level therein. The chamber receives gas induced liquid influent, the influent containing suspended impurities. The gas or air that is induced into the liquid influent is through eductor means external of the vessel chamber wherein gas is induced into the influent before entry of the combined induced gas influent flow into the chamber through at least one riser tube located in the chamber with the riser tubes containing additional coalescer means. The riser tube or tubes are in open communication with the liquid in the chamber at or below the liquid surface. The apparatus is provided with liquid level control means for maintaining and changing the liquid level in the vessel chamber as well as means for removing clarified liquid from a lower portion of the chamber. Trough means is provided in an upper gas collection portion of the chamber for the collection and removal of froth laden impurities. Suitable means are provided for maintaining a gas blanket for recirculation of the gas back for inducement into the eductor means and incoming fluid influent or recirculated fluid from within the vessel.

In general, the apparatus according to the invention is comprised of substantially a cylindrical gas tight fluid flow vessel. The vessel is generally a cylindrical vessel mounted upright and defining a vertical chamber therein for receiving gas induced influent and for providing a liquid chamber, an upper gas chamber zone and a froth collection chamber as well as suitable froth removal troughs. Optionally, mechanical skimming means can be used in combination with the trough or other conduit removable means. The gas tight fluid flow vessel provides means for separating impurities from the contaminated liquid.

The apparatus according to the invention provides a method for separating suspended impurities from contaminated liquid wherein the apparatus provides a vessel having an expanded chamber with inlet and outlet means for fluid flow. A contaminated liquid influent is mixed with gas through injector and static mixing means for maximum utilization of gas content in the form of very small bubbles. The gas induced influent is introduced into a liquid zone of the vessel chamber through at least one riser tube and coalescing means wherein the riser tube provides a relatively nonturbulent effervescent release of the gas induced influent generally below the surface of the liquid. The release of the gas induced influent which contains substantial volumes of induced gas provides for the contacting of suspended impurities with fine gas bubbles. By controlling the liquid level and floating the impurities in a froth, the method allows for flotation removal of the froth buildup to a collection zone in the upper portion of the vessel. Clarified liquid is withdrawn from a lower portion of the liquid zone. Entrained gas and/or make-up gas is collected in the uppermost section of the vessel. Said collected gas is induced into the influent stream by eductor means. Froth removal from the separator vessel may be on a periodic or continuous basis. In a periodic mode, a timer means closes the clarified liquid outlet valve thus raising the level of the fluid in the chamber and spilling over the surface floating froth into the trough. Once froth removal has been completed, timer means signals for full opening of clarified liquid outlet valve until froth accumulation subsequently warrants skim cycle to repeat. In a continuous mode, froth is constantly spilling into the trough and removed from the vessel. Mechanical skimmers may be utilized for constant skimming function. However, an additional feature of the invention provides for a high oil concentration probe and control means which will close the clarified liquid outlet valve independently when oil slugs are present in the influent water. This action causes continuous removal of all floating material and prevents discharge from clean water outlet valve for the duration of the high influent oil condition. Such a purge avoids the release of oil laden water from the unit.

In the general operation of the apparatus if viewed from above the liquid surface in the induced gas flotation chamber an effervescent bubble pattern or effervescent surface 30 would eminate substantially from the center since the coalescer riser 8 is positioned substantially axially aligned to the axis of the chamber with accumulating oil froth build-up at the periphery of the vessel's cross-section. Once the froth layer has accumulated to the point where it covers the cross-section of the chamber or at some time before such total build-up, an automatic timer means will signal a partial or full closure of the clarified water outlet valve thereby raising the liquid level in the tank to slightly above the lip of the skim trough. The froth then overflows into the skim trough and is discharged from the main chamber. Seconds later, the timer signals the clarified water outlet valve to resume its fully open position which allows the water level to recede to a level several inches beneath the skim trough. The induced gas coalescer apparatus 2 according to the invention may also be operated in a continuous skim mode through various electrical mechanical sensing and valve operative means.

The essence of finer bubbles in the context of the invention and in the flotation separation technology is the presentation of expanded surface area which dramatically increases the probability of gas bubble contact with contaminants i.e., suspended impurities. For instance, a course 9 millimeter (9,000 micron) gas bubble would present a surface area substantially smaller than 3 millimeters (3,000 microns) per unit volume. However, if the bubble size is further reduced to 0.10 to 0.25 millimeters (100 to 250 microns), the surface area yield would be many times greater for the identical gas inlet volume. Naturally, the finer 100 to 250 micron bubbles are advantageous because greater contaminant contact potential can be had because of the expanded surface area.

In nonturbulent flat water such as tap water sources, observable bubbles are many times larger in size when produced by air eductors commonly used in conventional induced gas flotation separators. According to the invention using the gas eductor in combination with the static mixer and in consideration to proper mixer sizing and critical velocities, the static mixer provides the capability of producing bubbles of approximately 100 microns, or smaller.

In order to balance power and efficiency requirements, a desireable bubble size in accordance to the one embodiment of the present invention will be approximately 250-300 microns at a maximum gas to water ratio range of about 30 to about 35% for most commercial applications. Regarding gas to water rates, it must be reminded that the use of too much gas intake may result in a gas continuous stream wherein a liquid mist would be formed rather than the desired "gas bubble". This liquid mist would be totally ineffective for the intended use of contact-coalescing for purposes of separating suspended impurities from water. The static mixer while allowing for maximum gas to water ratio volumes must be kept below those volumes of gas to water which would come to the gas continuous mist phase in the contacting region of the present invention.

In general, high gas volumes are advantageous for optimum contact coalescing. However, high gas volumes cause a formation of large bubbles which create turbulence within the separation chamber of a flotation separation system. Turbulence within the separation chamber interferes with the collection and phase separation of the contaminants at the liquid surface. According to the invention, high gas volume eductor and static mixer combinations allows for the provision of maximum gas volumes and the production of finer bubbles which are consistent with optimum contact coalescing.

In one exemplary use of a specific 100 gallons per minute system, the raw influent contains 80 milligrams per liter oil and grease and 350 plus milligrams per liter of Chemical Oxygen Demands ("C.O.D."). The clarified sample contains consistently less than 15 milligrams per liter oil and grease and less than 150 milligrams per liter C.O.D. On an average, the C.O.D. reductions are attributable to the removal of the oil and grease and suspended solids. Present governmental guides require that the discharge from the apparatus must meet a standard of no more than 15 milligrams per liter oil and grease and no more than 150 grams per liter C.O.D. A typical chemical additive used in accordance with the treatment of an aqueous influent stream would be for example a commercial flocculant agent.

The chemical and petroleum industries have significant needs for the method and apparatus according to the invention, however, other industries especially the food processing industries, for example, poultry processing, canneries and the like, use substantial amounts of water which must then be prepared to meet environmental standards before release.

One embodiment of the method and apparatus according to the invention is dependent upon maximizing gas induction in order to achieve optimum mass transfer of gas medium to contaminants, i.e., resulting in efficient contacting with the contaminants while controlling liquid turbulence and the reentrainment consequences thereof by providing microscopic gas bubbles in maximum volumes. In order to achieve these inventive conditions which result in reduced dwell time of the liquids being treated, a static mixing unit in combination with an eductor for inducing the air into the influent water followed by static mixing is used. Creation of fine bubbles is achieved in the static mixer with no moving parts in a simple construction which is comprised of a series of stationary rigid elements contained within a pipe or conduit. These elements form intersecting channels that split and rearrange the gas bubbles into smaller ones.

In gas-liquid mixing, the static mixers provide uniform dispersion of gases in liquids for a variety of chemical processes and water treatment applications. The static mixing elements continuously renew the gaseous bubble surface area, enhancing mass transfer between phases. This is accomplished by subjecting gas bubbles to sheer forces within the mixing elements. In the present invention the static mixers are used for the formation of microscopic bubbles for maximum surface area contacting potential.

The particular configuration or relative size of each component will be readily obvious to one skilled in the treatment of liquids and fluid flow systems especially in view of the present specification and drawings. The unique system vessel design and configuration allows for the placement of additional vessel(s) in modular fashion to accomodate future expansion requirements on an as needed basis rather than for installing anticipated capacities at the time of the initial installation.

Although the present invention has been described in connection with preferred forms thereof, it will be appreciated that additions, modifications, substitutions and deletions may be made without departing from the spirit and scope of the invention.

We claim:

1. A method for separating suspended impurities from contaminated liquids wherein the contaminated liquids have high particulate matter content comprising;
   providing a vessel having an expanded chamber with inlet and outlet means for fluid flow;
   inducing gas into a recycled clarified liquid stream;
   introducing the gas induced clarified liquid into a liquid zone of the expanded vessel through at least one riser tube and coalescent means in tandem and parallel to the introduction of contaminated influent liquid;
   releasing the gas induced clarified liquid and contaminated liquid influent into the vessel liquid below the vessel liquid surface;
   contacting suspended impurities with fine gas bubbles formed at the eductor static mixer means;
   controlling the liquid level;
   floating the froth laden impurities into a collection zone in an upper portion of the vessel;
   withdrawing the resulting clarified liquid from a lower portion of the liquid zone for release;
   and collecting the gas for recirculation.

2. A method for separating suspended impurities from contaminated liquid comprising:
   providing a vessel having an expanded chamber with inlet and outlet means for fluid flow;
   inducing gas into an admixture of recycle clarified liquid and liquid influent;
   contacting suspended impurities with fine gas bubbles formed by the induction of a pressurized gas source;
   introducing the gas induced clarified liquid recycle and influent mixture into a liquid zone of the expanded vessel chamber through at least one riser tube and coalescer means, s tube and coalescer means being in communication with the liquid zone of the chamber;

introducing the gas induced recycle clarified liquid-influent mixture into the chamber liquid below the liquid surface;

controlling the chamber liquid level;

floating froth laden impurities into a collection zone in an upper portion of the vessel chamber;

withdrawing resultant clarified liquid from a lower portion of the liquid zone;

withdrawing a portion of the clarified liquid for recycle; and removing the froth laden impurities from the collection zone.

3. The method according to claim 2 wherein the fine gas bubbles are formed within the recycle clarified liquid by eductor means before introduction of the influent and before the two streams are admixed in riser coalescer means.

4. A method for separating suspended impurities from contaminated liquid comprising;

providing a vessel having an expanded chamber with inlet and outlet means for fluid flow;

inducing gas into a contaminated liquid influent;

contacting suspended impurities with fine gas bubbles formed at the eductor static mixer means;

introducing the gas induced influent into a liquid zone of the expanded vessel chamber through at least one riser tube and coalescent means;

releasing the gas induced influent into the liquid below the liquid surface;

controlling the liquid level;

floating the froth laden impurities to a collection zone in an upper portion of the vessel;

withdrawing the resulting clarified liquid from a lower portion of the liquid zone; and collecting the gas for recirculation.

5. The method according to claim 4 wherein the separation of suspended impurities from contaminated liquid is achieved in the vessel in a single fluid flow pass by means of an upflow release of the introduced gas induced influent into the liquid zone of the vessel chamber at or below the liquid level surface providing release of fine gas bubbles; thus forming froth and floating fluid medium which contains the suspended impurities of the gas induced influent.

6. The method according to claim 4 wherein the withdrawal of the resulting clarified liquid from the lower portion of the liquid zone is temporarily reduced thereby raising the liquid level surface within the chamber and floating the froth laden impurities to the surface of the liquid level into receiving and removal troughs.

7. The method in accordance with claim 4 wherein the froth laden impurities are mechanically swept or skimmed from the surface at the liquid interface.

8. The method according to claim 4 wherein the release of the gas induced liquid at or near the surface of the liquid provides a substantially effervescent motion void of sufficient turbulence which would otherwise cause reentrainment of rising and floating impurities.

9. A method according to claim 4 wherein the released gas from the gas induced influent is collected in an upper zone of the chamber for supply to gas eductors.

10. The method in accordance with claim 4 wherein the gas bubbles are of microscopic size as a result of flowing gas injected liquid through a gas-liquid static mixer.

11. The method according to claim 10 wherein the maximum gas to liquid ratio is not great enough to cause gas continuous liquid mist formation.

12. An apparatus for removing suspended impurities from liquids, comprising a single cell fluid flow vessel defining a chamber for receiving gas induced liquid influent, the influent containing suspended impurities;

an eductor means for inducing gas into said influent means for introducing said gas induced influent into the vessel chamber through at least one riser tube located in the chamber, the riser tube containing coalescent means, the riser tube being in open communication with liquid contained in the chamber, said communication being below the liquid surface;

liquid level control means which comprises a water-leg standpipe with adjustable coupling to manually raise or lower liquid level in the vessel chamber;

means for removing clarified liquid from a lower portion of the chamber;

means in an upper, gas collection portion of the chamber for collection and removal of froth laden impurities from the surface of the liquid; and means for collecting gas for recirculation inducement through the eductor means.

13. An apparatus for removing suspended impurities from liquids, comprising:

a single cell fluid flow vessel defining a chamber for receiving gas induced liquid influent, the influent containing suspended impurities;

an eductor means for inducing gas into said influent means for introducing said gas induced influent into the vessel chamber through at least one riser tube located in the chamber, the riser tube containing coalescent means, the riser tube being in open communication with liquid contained in the chamber, said communication being below the liquid surface;

displacement liquid level controller means which comprises an automatic level controller functional through electrical mechanical means for controlling liquid level and fluid flow into and from the vessel chamber in conjunction with vessel valving;

means for removing clarified liquid form a lower portion of the chamber;

means in an upper, gas collection portion of the chamber for collection and removal of froth laden impurities from the surface of the liquid; and means for collecting gas for recirculation inducement through the eductor means.

14. An apparatus for removing suspended impurities from liquids, comprising:

a single cell flow vessel defining a chamber for receiving gas-induced liquid influent admixed with recycle liquid, the admixture containing impurities;

a pressurized gas source, a means for inducing said gas into said influent and clarified recycle liquid, means for introducing said gas-induced liquid admixture into the vessel chamber through at least one riser tube, the riser tube containing coalescent means, the riser tube being in communication with liquid contained in the vessel chamber, said communication being below the liquid surface in the chamber;

liquid level control means for maintaining and changing the liquid level in the vessel;

means for removing clarified liquid from a lower portion of the chamber;

means for removing clarified liquid from a lower portion of the chamber for recycle; and means in an upper portion of the chamber for collection and removal of froth laden impurities from the surface of the chamber liquid.

15. The apparatus according to claim 14 wherein the pressurized gas source is from a gas blower means.

16. The apparatus according to claim 14 wherein the pressurized gas source is introduced through an eductor means.

17. The apparatus according to claim 14 wherein the pressurized gas source is from a degasser vessel under pressure.

18. The apparatus according to claim 14 wherein the pressurized gas source is from a static separator under pressure.

19. The apparatus according to claim 14 wherein the apparatus is further comprised of a probe means positioned within the liquid and which senses slugs of high oil concentration in the influent, the probe in communication with means for activating clarified liquid valves means, said valve means capable of being closed or partially closed and independently changing the liquid level in the chamber in order to overflow purge the apparatus of oil slug concentrations.

20. The apparatus according to claim 14 wherein a trough means is in contact with the circumference of the upper portion of the vessel, the trough means being adjustable in height in relationship to the liquid level.

21. The apparatus according to claim 14 wherein means are provided in an upper portion of the chamber for gas collection and removal.

22. An apparatus for removing suspended impurities from contaminated liquid, comprising a substantially vertical vessel defining a chamber with an upper end portion froth laden impurity collection zone with the remainder of the chamber defining a liquid flow portion;

a pressurized gas source and means for inducing gas into recycled clarified liquid, the means having a gas inlet conduit and a chamber wherein a mixture of said induced gas and clarified liquid is achieved with dispersion of gas through the clarified liquid;

means for introducing an influent into the gasified-clarified liquid;

means for introducing the mixture of influent and gasified-clarified liquid into the vessel chamber through at least one riser tube, the riser tube containing coalescent means, the riser tube being in communication with liquid contained in the chamber, said communication being below the liquid surface;

controlling the chamber liquid level;

means for floating froth laden impurities into a collection zone in an upper portion of the vessel chamber;

means in the upper portion of the vessel chamber collection zone for removal of froth laden impurities from the surface of the liquid; and withdrawing a resultant clarified liquid from the lower portion of the liquid zone of the chamber for release and recycle.

23. The apparatus according to claim 22 wherein the influent is from a collection and skimmer vessel with gasified discharge from an apparatus for removing suspended impurities from contaminated liquid, comprising a substantially vertical vessel defining a chamber with an upper end portion froth laden impurity collection zone with the remainder of the chamber defining a liquid flow portion;

a pressurized gas source and means for inducing gas into recycled clarified liquid, the means having a gas inlet conduit and a chamber wherein a mixture of said induced gas and clarified liquid is achieved with dispersion of gas through the clarified liquid.

24. The apparatus according to claim 22 wherein the pressurized gas source and means for inducing gas into the recycle clarified liquid and influent is comprised of an eductor means.

25. An apparatus according to claim 22 wherein the pressurized gas source is achieved through external blower means.

26. An apparatus according to claim 22 wherein gas collection means are supplied in an upper portion of the chamber for collection and removal.

27. The apparatus according to claim 22 which is further comprised of a probe means positioned within the chamber liquid which senses slugs of oil concentration in the gasified recycle clarified liquid and influent liquid admixture, the probe in communication with means for activating clarified liquid valve means, said valve means capable of being closed or partially closed and independently changing liquid level in the chamber in order to overflow purge the apparatus of oil slug concentrations.

* * * * *